United States Patent [19]

Ide

[11] 4,144,962
[45] Mar. 20, 1979

[54] ADJUSTABLE ATTITUDE LOADING TRIMMER

[76] Inventor: Allan R. Ide, 10066 Bloomfield, Cypress, Calif. 90630

[21] Appl. No.: 797,998

[22] Filed: May 18, 1977

[51] Int. Cl.² .......................................... B65G 31/02
[52] U.S. Cl. .................................. 198/641; 198/564
[58] Field of Search ............... 198/641, 319, 564, 638, 198/639, 640, 642; 214/15 E, 18.22, 18.24, 18.3, 18.36

[56] References Cited

U.S. PATENT DOCUMENTS

| | | | |
|---|---|---|---|
| 2,125,088 | 7/1938 | Sinden | 198/641 |
| 2,950,809 | 8/1960 | Sinden | 198/638 |
| 3,039,595 | 6/1962 | Lucas | 198/564 |
| 3,136,405 | 6/1964 | Kulla | 198/564 |
| 3,179,235 | 4/1965 | Lucas | 198/641 |
| 3,342,300 | 9/1967 | Foy | 198/641 |

Primary Examiner—Robert B. Reeves
Assistant Examiner—Richard K. Thomson
Attorney, Agent, or Firm—Fulwider, Patton, Rieber, Lee & Utecht

[57] ABSTRACT

A loading trimmer for dispersing granular material from a loading chute in an adjustable trajector into the hold of a ship or the like. A trimmer carriage with spaced drums carrying an endless belt is positioned below the chute outlet and pivotal about the center of a pair of idler wheels which centrally engage the belt on either side thereof to form an arcuate material receiving and dispersing path. One of the drums is driven by a motor mounted on a remote pivotal platform connected to the trimmer carriage by connecting rods. The carriage is also connected to a remote crank through connecting rods and the crank is driven by a motor which controls the angle of the carriage with respect to the chute and the trajectory of the dispersion.

4 Claims, 3 Drawing Figures

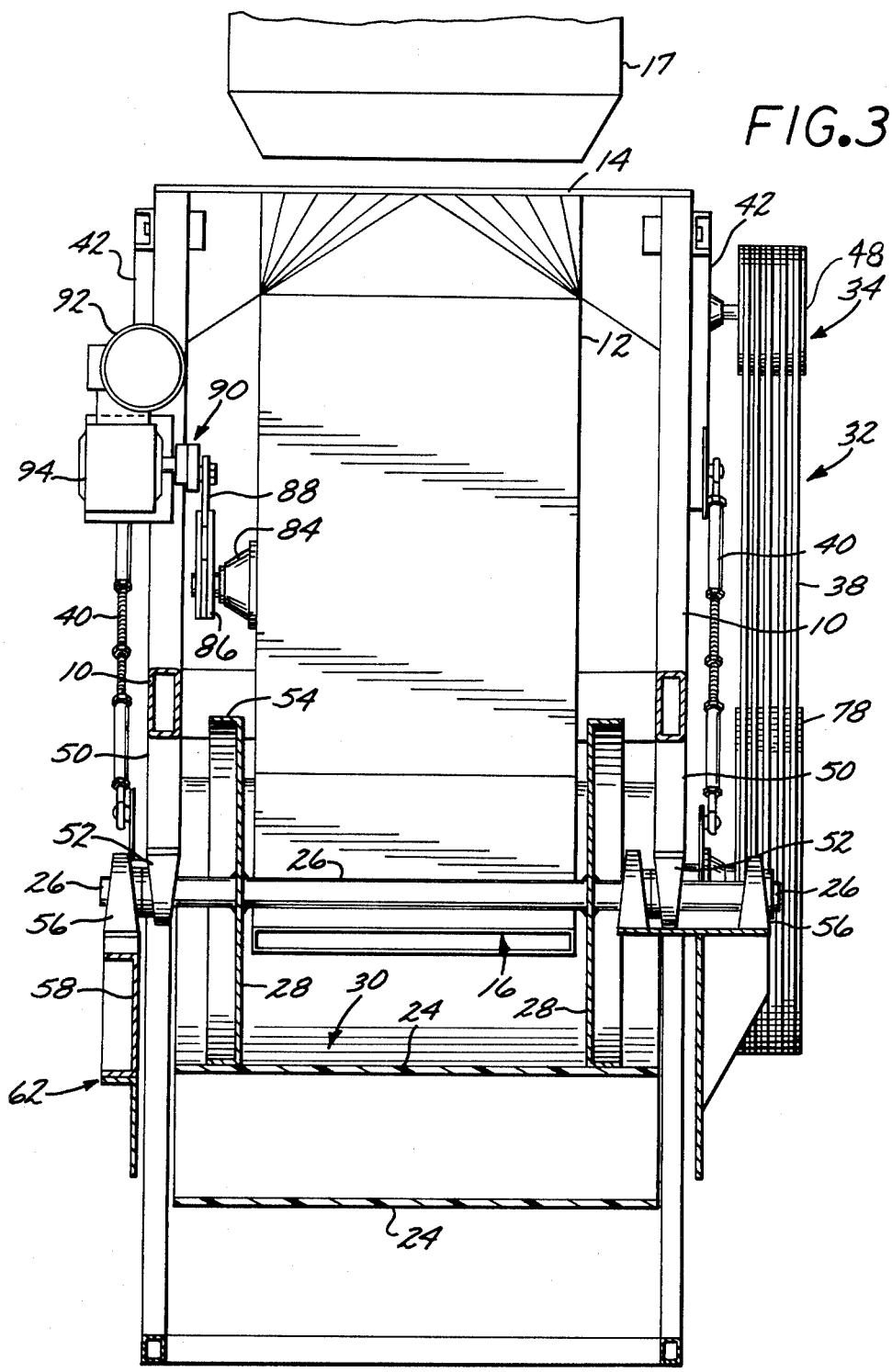

ADJUSTABLE ATTITUDE LOADING TRIMMER

BACKGROUND OF THE INVENTION

1. Field of the Invention

The present invention relates generally to trimmers for loading chutes and, more particularly, to such a trimmer whereby its attitude is adjustable to control the trajectory of the dispersed material.

2. Description of the Prior Art

In loading granular material such as grain or crushed ore into the holds of ships or the like through loading chutes, it is typically either difficult or impossible to move the loading chute from one portion of the hold to another in order to assure an even distribution of the granular material. Even distribution is particularly necessary in the case of a ship's hold in order to maintain the ship at the proper trim. In such instances, it is typical to employ a trimmer on the end of the loading chute which disperses the granular material outwardly in a horizontal direction and in a particular trajectory chosen to deposit the dispersed material at the desired place within the hold. A relatively conventional design for such a trimmer includes a transition funnel to shape the material stream from the loading chute to that needed by the trimmer and a driven belt on a carriage positioned below the outlet of the loading chute with the belt having an arcuate path for receiving the granular material and then dispersing it substantially horizontally in a particular trajectory. The belt is usually held by a pair of drums spaced on a carriage and a pair of idler wheels on either side of the belt depress it between the drums to form the arcuate path.

The basic belt, drum and idler wheel combination has been physically arranged with respect to the outlet of the loading chute in a number of ways and provision is made for varying the angle of trajectory from a remote location by varying the position of one of the drums. However, this arrangement varies the tension on the belt and the resultant slippage causes undue wear on the belt. Other constructions have been made with the carriage pivotal about the idler wheel center with various arrangements shown for driving the belt and/or the idler wheel. Designs of this type are illustrated in, for example, the patents to Foy U.S. Pat. No. 3,342,300 and McGivney U.S. Pat. No. 2,879,880. However, these prior art constructions usually involve placing the drive motors for the drum and/or idler wheel relatively close to the mechanism and in a complicated arrangement which tends to clog easily depending upon the granular material being dispersed and are difficult to service.

Thus, there has been a need for a trimmer for use with a loading chute which could be easily adjusted to vary the trajectory of the material dispersed but which would be relatively uncomplicated and free from clogging. The adjustable attitude loading trimmer of the present invention satisfies that need.

SUMMARY OF THE INVENTION

The present invention provides a loading trimmer for dispersing granular material which has an adjustable attitude with respect to an associated loading chute to provide for varying the trajectory of the dispersed granular material. With the trimmer of the invention, the drums carrying the belt on the carriage are pivotal about the axis of the idler wheels which engage the belt to form the arcuate pathway for the material to be dispersed. The pivotal carriage on which the drums are mounted is connected to a remote pivotal platform on which is mounted the drive motor for the driven drum. Thus, while the trimmer carriage pivots about the idler wheel axis, the remotely mounted motor moves cooperatively on its pivotal platform to maintain a proper workable tension on the belt drive for the driven drum.

In the loading trimmer of the invention, pivotal movement of the trimmer carriage is effected by a remotely mounted motor driven crank connected to the carriage by means of a connecting rod.

Thus, the loading trimmer of the present invention is adjustable in its attitude from a remote location to vary trajectory of the dispersed material and the drive motor for the carriage is also remotely mounted and positionally connected to the carriage by means of a connecting rod to decrease substantially the possibility of clogging the drive means for the trimmer, both in the drive motor and in the motor driven crank.

These and other features of the present invention will be appreciated from the following detailed description of the drawings.

BRIEF DESCRIPTION OF THE DRAWINGS

FIG. 3 is a sectional view of the loading trimmer taken in the direction of lines 3—3 of FIG. 1.

DESCRIPTION OF THE PREFERRED EMBODIMENT

Figure 1:
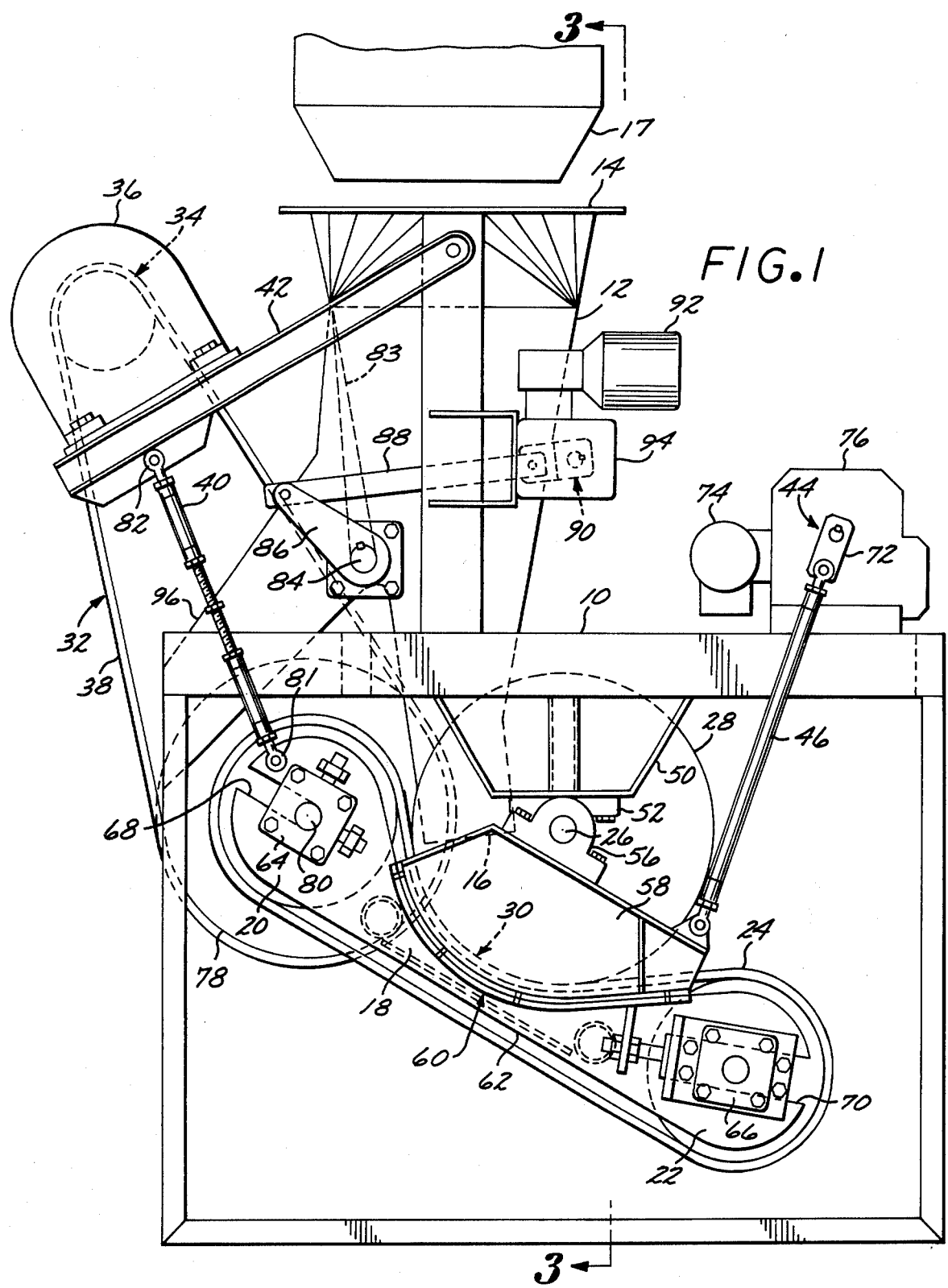
FIG. 1 is a side elevational view of the adjustable attitude loading trimmer of the present invention shown spaced from the lower end of a loading chute, the trimmer carriage being shown in a first position.

Turning now to the drawings, the loading trimmer of the present invention generally includes a frame 10 on which is mounted a generally vertical intake and discharge transition funnel 12 generally circular at its top 14 which transforms into a generally rectangular exit port 16. The transition funnel 12 is shown spaced from the bottom of the loading chute 17 for illustration. The trimmer includes a trimmer carriage 18 on which are mounted two spaced belt drums 20 and 22 which carry an endless belt 24 with a width proportional to the length of the rectangular exit port 16. The trimmer carriage 18 is pivotally mounted at 26 to the frame 10, the pivot also being the center of a pair of spaced idler wheels 28 spaced on either side of the belt 24 adjacent the exit port 16. The idler wheels 28 engage the belt 24 to form an arcuate pathway 30 which receives the granular material from the exit port 16 and, through motion of the belt 24, disperses it off the end of the pathway 30 with a predetermined trajectory depending upon the orientation of the trimmer carriage 18. The belt 24 is driven by means of a belt drive assembly 32 attached to a driven drum 20 and drive shaft sheave 34 of a drive motor 36. Proper tension on a belt 38 of the drive assembly 32 is maintained by means of a connecting rod 40 positioned between the trimmer carriage 18 and a cooperatively movable pivotal platform 42 on which the motor 36 is mounted. The attitude of the trimmer carriage 18 is adjustable by means of a motor driven crank 44 connected by a connecting rod link 46 to the trimmer carriage. Thus, both the motor driven link 44 and the drive motor 36 for the belt 24 are remotely positioned with respect to the trimmer carriage 18 to prevent clogging and fouling of their mechanisms.

The substantially exposed remote position of the motor 36 and the drive shaft 34 also permits the changing of the drive shaft sheave 34 with ease in order to vary the rotational velocity of the drums 20 and 22 which in turn increases or decreases the speed of the belt 24 in the arcuate pathway 30. Thus, the velocity of the granular material as it exits the loading trimmer may be varied with relatively simple changes in the sheave 34 of the drive assembly 32.

With more particularity, the main frame 10 includes a pair of brackets 50 which support a pair of pillow blocks 52 which support the axle 26. On the inside of the brackets 50 is mounted the idler wheel (FIG. 3), the circumference of which at 30 includes flanges 54 which form flat belt engaging surfaces. On the outside of bracket 50, there is pivotally mounted a pillow block 56 on a conveyor support plate 58 which is attached along a curved seam 60 corresponding to the arcuate pathway 30 of a conveyor frame 62 which serves as a mounting frame for the drums 20 and 22. The drums 20 and 22 are mounted at their axial ends with journals 64 and 66, respectively, which are adapted to be slidable within adjustment channels 68 and 70, respectively. The journals 64 and 66 are positioned within the channels 68 and 70, respectively, so that the position of the drums 20 with respect to the idler wheels 28 is such that the desired arcuate path 30 is developed as indexed by the shape of the junction 60 of the support plate 50 and the conveyor support plate 62. In addition, the drums 20 and 22 may be positioned by means of the journals 64 and 66 and channels 68 and 70, respectively, to create the desired tension on the belt 24 against the idler wheels 28.

It should be appreciated that, when the drums 20 and 22 are properly positioned, the tension and position of the belt 24 will not change with changes in attitude of the trimmer of the present invention. Thus, the trimmer carriage 18 may be pivoted about the axis or axle 26 of the idler wheel 28 to change the angle of trajectory of the granular material dispersed without changing the tension on the belt 24 or the shape of the arcuate path 30.

Figure 2:
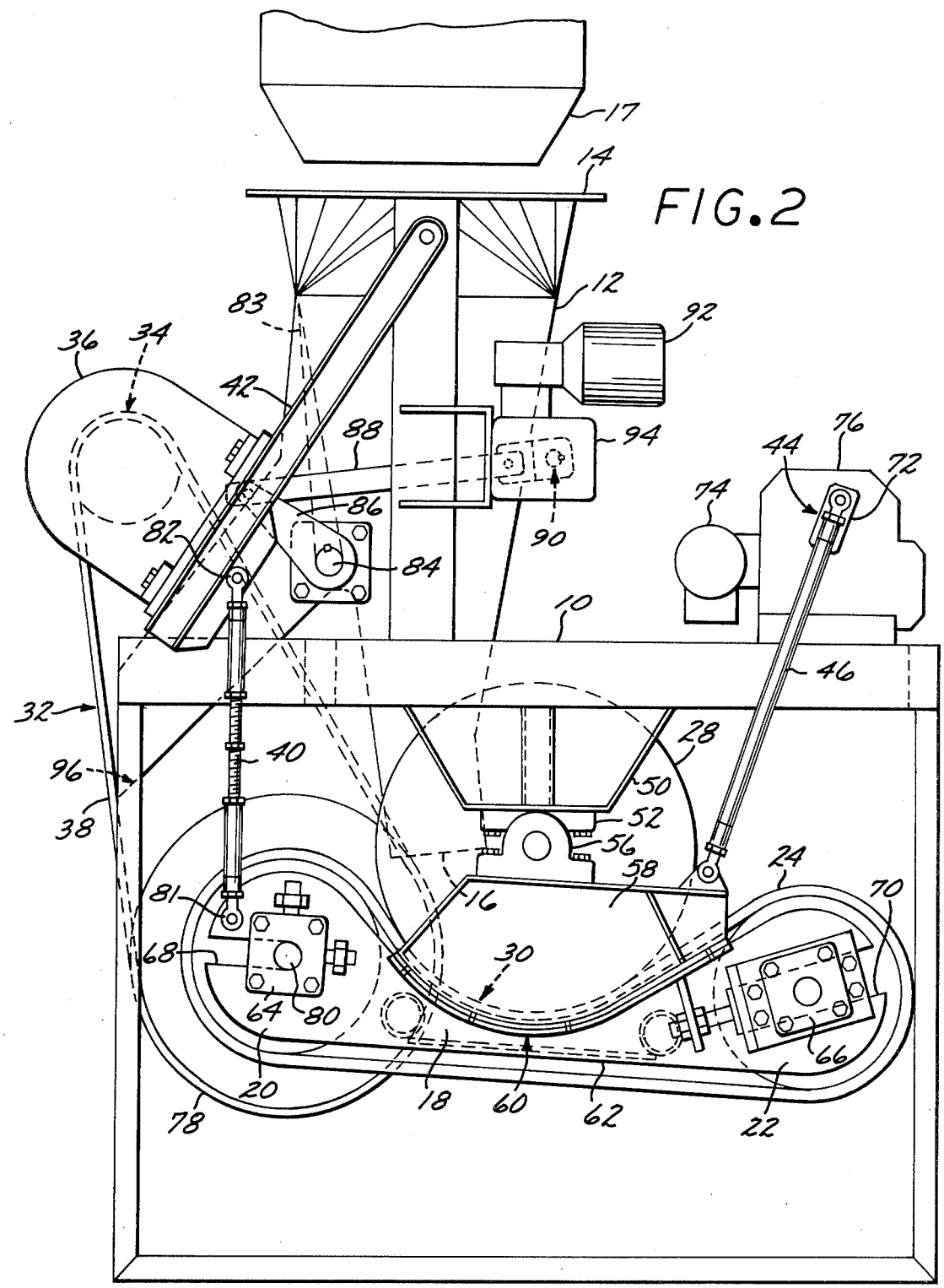
FIG. 2 is a side elevational view of the loading trimmer of the invention shown with the trimmer carriage in a second position.

The change in attitude of the trimmer carriage 18, and corresponding change in trajectory of dispersed material, is effected by the crank 44, as briefly described above. The carriage 18 is connected by means of the connecting rod 46 to an outer end of a crank arm 72 driven by a motor 74 and gear reduction box 76. Rotation of the crank arm 72 varies the attitude of the trimmer 18 between the extreme positions illustrated in FIGS. 1 and 2. In FIG. 1, the angle of trajectory produced is approximately five degrees, while in the opposite extreme position, shown in FIG. 2, the angle of trajectory is ideally approximately twenty degrees. It should be appreciated that by adjusting the connecting rod 46 and the length of the crank arm 72, that both the initial and end points as well as the range of trajectories produced by the trimmer of the invention, may be varied depending upon the material to be dispersed and the particular space which is to be loaded with the material. In addition, the use of the crank 44 for adjustment of the attitude of the trimmer carriage 18 provides for the substantially continuous modification of the trajectory by means of the selective application of power to the motor 74 driving the gear reduction box 76.

The belt 24 is moved through its arcuate path 30 by driving the drum 20 through a drive means 32, as best seen in FIG. 3, which includes a pulley wheel 78 mounted on an axle 80 of drum 20 and belt driven through a belt 38 from the drive means 34 including the drive pulley wheel 48 and motor 36. The drive pulley wheel 78 and the driving pulley wheel 48 mounted on the motor 36 are maintained in substantially constant spaced relationships by means of the adjustable connecting rod 40 which is pivotally mounted on the trimmer carriage 18 and the pivotal platform 42, as discussed above.

As will be appreciated, the speed of the belt 24 may be relatively easily adjusted by changing the diameter of the drive pulley 48 which is facilitated by its easily accessible location on the platform 42. Similarly, compensating for a modified diameter of the drive pulley 48 is relatively simply accomplished by changing the length of the adjustable connecting rod 40.

The loading trimmer is conventionally supplied with a diverter plate 83 connected through a journal 84 to a link arm 86 pivotally connected to a connecting rod 88 to a crank 90 which is driven by a motor 92 through a gear reduction box 94. Thus, when the trimmer is not to be used, the diverting gate 83 may be used to divert the granular material through the diversion chute 96.

Thus, the loading trimmer of the invention provides a carriage with spaced drums carrying an endless belt which is formed into an arcuate path by means of a pair of idler wheels, the axis of which is the pivot point for the carriage. The belt is driven by means of a belt drive from a motor mounted on a remotely mounted pivotal platform and the attitude of the carriage may be varied by means of a crank from a remotely mounted motor.

While a particular preferred embodiment of the invention has been described and illustrated, it should be appreciated that modifications in the described structure may be made and the invention is not to be limited except by the following claims.

I claim:

1. An adjustable attitude loading trimmer for dispersing granular material from a vertical loading chute in a substantially horizontal adjustable trajectory, said loading trimmer comprising:
    a carriage positioned below said loading chute suspended therefrom by means of a horizontal pivot means;
    first and second belt drums mounted in spaced relationship on said carriage;
    a belt mounted on said drums for movement thereabout;
    a pair of idler wheels mounted in axially spaced relationship on said first axis and in central contact with the edges of said belt between said drums to form said belt into an arcuate path below said loading chute;
    drive motor remotely spaced from and drivingly coupled to one of said first and second drums;
    an elongated motor platform pivotally connected on one end to said chute and carrying said motor on its opposite extremity;
    a connecting rod pivotally connected between said extremity of said platform and said carriage adjacent the driven drum;
    a control rod pivotally connected between said chute and carriage at a point opposite to said driven drum;
    and control means mounted from said chute and coupled with said control rod for pivoting said carriage about said horizontal axis to vary the attitude of said carriage with respect to said loading chute whereby said control means may be actuated to shift said control rod to rotate said carriage about said idler wheels and carry said motor platform therewith.

2. The adjustable attitude loading trimmer defined in claim 1 including:
   a transition funnel mounted on said platform between the outlet of said vertical loading chute and the vicinity of the arcuate path formed by said belt, said transition funnel having a substantially circular intake for engaging said loading chute and a substantially rectangular outlet for dispensing said granular material across said belt.

3. The adjustable attitude loading trimmer defined in claim 1 wherein:
   said control means is a crank drive and motor.

4. An adjustable attitude loading trimmer defined in claim 1 that includes:
   belt drive means coupling said drive motor to said drive drum and wherein:
   said connecting rod includes length adjustment means for adjusting the length thereof to adjust the tension of said belt means.

* * * * *